Nov. 2, 1965  L. H. MATTES  3,214,876
NAIL ANCHORED BUILDING SIDING
Filed Dec. 10, 1962  2 Sheets-Sheet 1
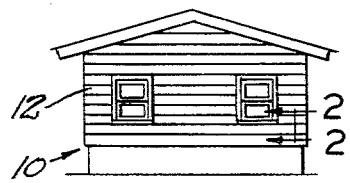
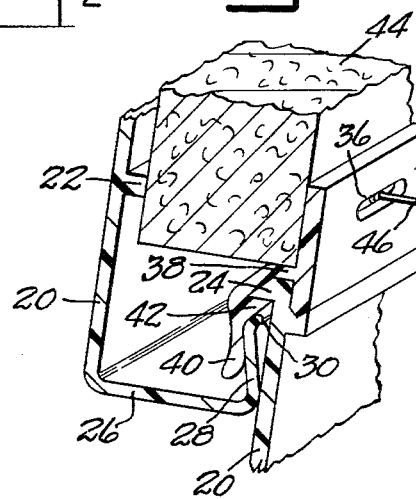
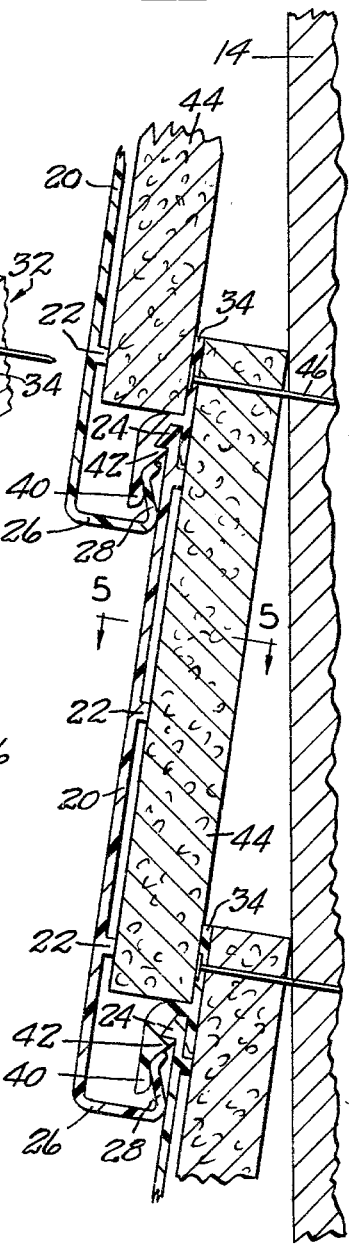
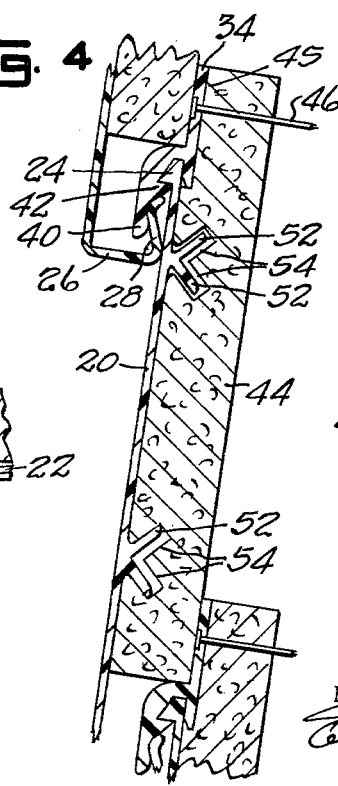
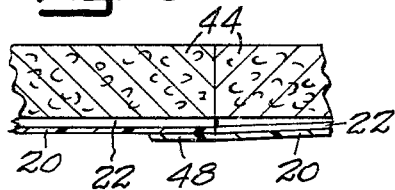
INVENTOR.
LEE H. MATTES
BY
ATTORNEY Nov. 2, 1965
L. H. MATTES
3,214,876
NAIL ANCHORED BUILDING SIDING
Filed Dec. 10, 1962
2 Sheets-Sheet 2
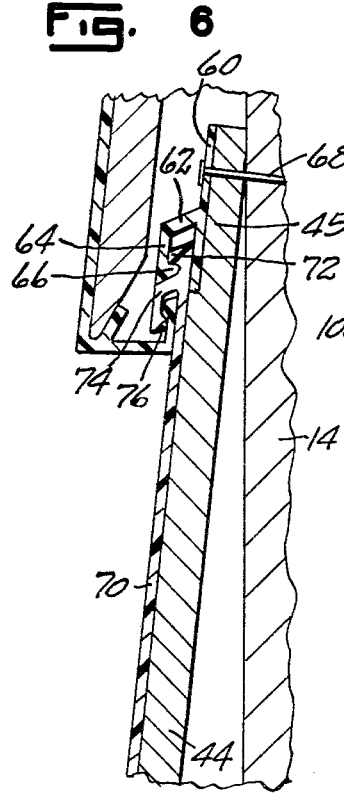
Fig. 6
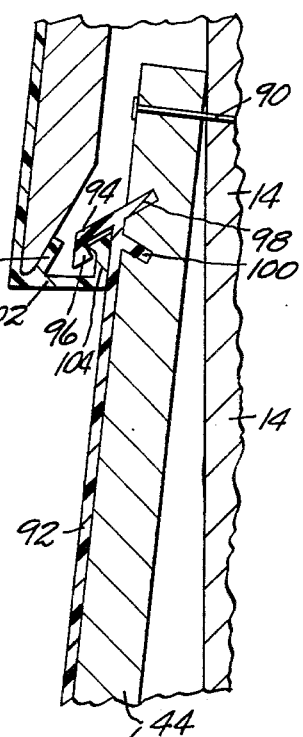
Fig. 7
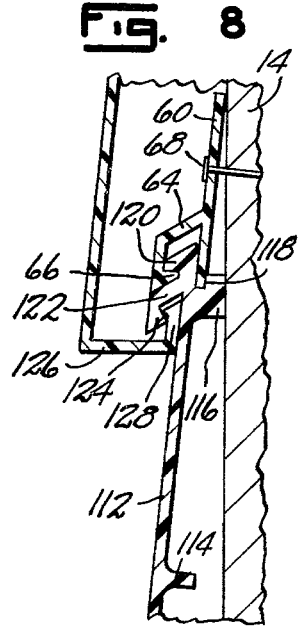
Fig. 8
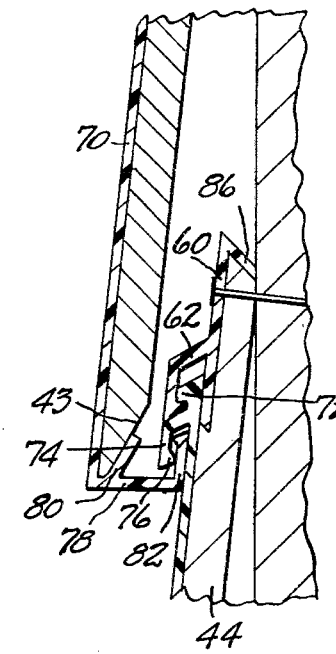
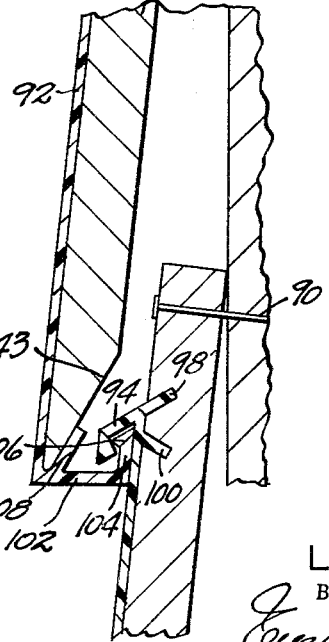
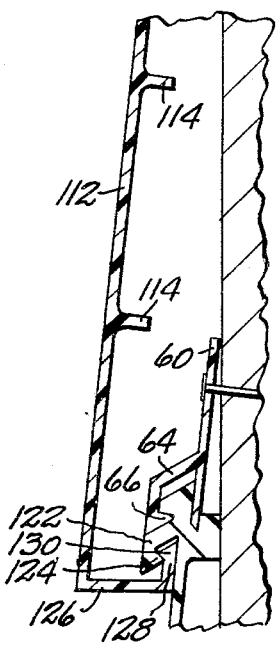
INVENTOR.
LEE H. MATTES
BY
Eugene C. Knoblock
ATTORNEY

United States Patent Office 3,214,876
Patented Nov. 2, 1965

3,214,876
NAIL ANCHORED BUILDING SIDING
Lee H. Mattes, South Bend, Ind., assignor to Mastic Corporation, South Bend, Ind., a corporation of Indiana
Filed Dec. 10, 1962, Ser. No. 243,496
2 Claims. (Cl. 52—520)

This invention relates to improvements in nail anchored building siding. More particularly, it relates to siding material having a thin exposed plastic panel.

The use of plastic panels for exterior building siding material presents attractive possibilities with respect to permanence of finish and coloration, a wide variety of available colors, long life and other properties. However, plastic materials are subject to expansion and contraction, and also require support by a backing panel in cases where the cost of the plastic is to be maintained at a minimum for economy. These factors, coupled with the fact that plastic has a heat insulation property rather than heat transfer properties which characterize metals, present a problem in the design of a plastic siding with respect to differences in heat response and expansion in exposed and overlapped plastic siding parts. This is important because siding must be applied quickly and easily by nailing in a manner to avoid alteration of appearance as by the forming of ripples therein or indentations and bulges, as are likely to occur if plastic siding members in partially lapping relation are alternately heated and cooled while they are anchored or nailed.

It is the primary object of this invention to provide a novel, simple siding material taking advantage of the properties of plastic sheet stock, which can be applied to place in an exposed location by nailing, and which has a permanent attractive appearance and is free from distortion and deforming when installed.

A further object is to provide a novel interlock clip which can be employed to anchor a plastic siding sheet in place adjacent its upper margin and which can be nailed in place close to the anchor point to provide assured support for the upper margin of the panel without subjecting the panel to deforming incident to expansion and contraction or incident to stress applied by nails.

A further object is to provide a siding member of this character which is supported by a backer panel and in which a backer panel of any thickness in a wide range of thicknesses may be employed.

A further object is to provide a siding member of this character anchored in place by a nailing clip with which it has a free sliding mechanical interlock and wherein the nailing clip is completely concealed so as to be protected against solar radiation without producing in the construction, as applied, any distortion due to differences in heating effects upon the concealed clips and the exposed panels.

Other objects will be apparent from the following specification.

In the drawings:

FIG. 1 is an elevation of a building utilizing my improved siding;

FIG. 2 is an enlarged fragmentary vertical sectional view taken on line 2—2 of FIG. 1 and illustrating one embodiment of the invention;

FIG. 3 is a detail perspective view of the construction;

FIG. 4 is a vertical sectional view similar to FIG. 2 and illustrating a slightly modified embodiment of the invention;

FIG. 5 is a fragmentary horizontal sectional view taken on line 5—5 of FIG. 2;

FIG. 6 is a fragmentary vertical sectional view similar to FIG. 2 and illustrating another embodiment of the invention;

FIG. 7 is a vertical fragmentary sectional view similar to FIG. 2 and illustrating still another embodiment of the invention; and FIG. 8 is a vertical sectional view similar to FIG. 2 and illustrating still another embodiment of the invention.

Referring to the drawings, and particularly to FIGS. 1, 2, 3 and 5, which illustrate one embodiment of the invention, the numeral 10 designates a building having my new siding 12 applied thereto in a manner similar to or resembling clapboard siding. The siding is secured to suitable framework of the building, such as conventional studs 14 or other frame members.

My improved siding 12 constitutes a sheet or panel 20 of plastic material, such as polyvinyl chloride, which may be of any desired type useful or suitable for exterior use. The panel will preferably be of a thickness to render it substantially shape-retaining and substantially rigid. Preferably the plastic will be from .030″ to .050″ in thickness. If the panels are formed of aluminum, their thickness may range from .019″ to .024″. The rigidity of the panel may be increased by spaced parallel longitudinal ribs 22 at its back surface, forming reinforcements, said ribs 22 preferably being shallow and extending substantially parallel to each other and to the margins of panel 20. The panel 20 will preferably be of substantially uniform thickness throughout and preferably of uniform width throughout. The panels 20 will usually be made in selected lengths, such as lengths of six feet or eight feet, which can be handled, packed and shipped easily. At its upper longitudinal margin the panel 20 has a forwardly projecting anchor bead 24 which may be of any suitable configuration and which is here illustrated as tapering toward its free longitudinal edge.

The opposite or lower margin of each panel 20 has an inturned bottom flange 26 whose width is substantially equal to the butt width desired between overlapping siding panels in adjacent courses. An upturned flange 28 is formed integrally with the bottom flange 26 and preferably extends therefrom at such an angle as to be characterized by an upward converging relationship with respect to the panel 20. The upturned flange 28 preferably terminates in a free upper marginal lip 30 which is outturned from the flange 28.

Clips 32 are utilized to mount the panels 20 upon the building frame. Clips 32 are preferably formed of plastic material similar to the material of which the panels 20 are formed, although it will be understood that a different type of plastic material may be employed or that the clips 32 may be formed of metal. Each clip 32 has a narrow elongated plate portion 34 of selected thickness and of selected length. Thus the width of the clip may be only a few inches or may be of the same length as the panels 20 or of any intermediate length. Each clip plate 34 has a nailing hole 36 therein. Preferably, two or more nailing holes 36 are provided, each of elongated shape and extending lengthwise of the plate 34. Intermediate its height each clip plate 34 has projecting therefrom, spaced below the nailing holes 36, an integral longitudinal web 38 from which depends a hook flange 40. The hook flange 40 is characterized by longitudinal rib 42 at its inner surface opposite the lower marginal portion of the clip plate 34 and spaced therefrom a distance substantially equal to or slightly greater than the thickness of the plastic panel 20.

The web 38, rib 42 and the upper part of the hook flange 40 are so configured that they form in cooperation with the lower marginal portion of the clip plate 34 a socket to snugly and slidably receive the upper anchor bead 24 of a panel 20. Thus the socket will preferably be configured similarly to the cross-sectional configuration of the bead 24. This not essential, however, and any configuration of the parts which will permit sliding reception of the bead 24. This is not essential, however, and any ported retention of the panel 20 thereby may be utilized. The lower or free portion of the flange 40 of the clip will be spaced forwardly from the plastic panel 20 suspended by the clip so as to accommodate reception of the flange 28 and the lip 30 at the lower end of an overlapping panel between said clip flange 40 and the overlapped upper marginal portion of the clip suspended panel 20 in the next lower course.

Panels of insulation material 44 are utilized with the plastic or metal panels 20. Panels 44 are preferably of slightly narrower width or of less vertical dimension as installed than the panels 20. Panels 44 are preferably formed of compact fibrous material commonly used in the building art and referred to as an insulation panel. Various thicknesses of such material are available on the market, such as ⅜", ½" and ¾". Two materials well known for this purpose are known as "Celotex" and "Insulite" and are characterized by rigidity, high insulation properties, strength and sound damping. The panels 44 may be suitably coated or saturated at their surface portions by waterproofing material, such as asphalt. The panels 44 may be of any selected length.

The panels 44 are mounted on a building wall or frame with the lower margin of those in each course overlapping the upper margin of those on the course next below. The panels 44 have the base plate 34 of one or more clips bearing thereagainst at their upper marginal parts and are nailed to the building frame or studding 14 by nails 46 which pass through the nailing holes 36 of the clips and through the body of the insulation panel 44 and thence into the frame or studding. Insulation panels 44 are mounted end to end across the wall of the building in horizontal alignment in this fashion to define one course of siding. The siding panels 20 are then applied in place by sliding the anchor bead 24 of each in the socket of each adjacent clip 32 so that the clip supports and suspends the panel 20. At its lower end or margin each panel 20 has its upturned flange 28 seating behind the lower margin of the hook flange 40 of the clip or clips suspending the next lower row or course of panels 20 and preferably has the junction or bent portion between the inturned bottom flange 26 and the upturned flange 28 bearing against the outer surface of the next lower panel 20.

Adjacent panels 20 in the same course preferably overlap, as seen at 48 in FIG. 5. To facilitate this overlap the flanges 22, the anchor beads 24 and the flange 26, 28 preferably terminate spaced from the end of the panel at one end thereof to permit lapping at 48 of only the flat panel portions 20. The edge of the lapping panel may be bevelled.

By virtue of the construction of the siding and mounting thereof as above described, no nailing stress is applied directly to the plastic panel 20. Any nail stresses applied to the clip 32 are localized and concealed and are not transmitted to any exposed part of the panels 20. At the same time effective anchorage of the siding parts is secured by the use of nails, and any number of nails required for anchorage of each course may be employed. Inasmuch as plastic does not have the heat transfer properties which characterize metal, the clips 32 are insulated and protected from the temperatures which are effective upon the exposed portions of the panels 20. The fact that the clips 32 may be cooler than the solar exposed parts of the siding has no detrimental effect on the assembled siding, however, since expansion may occur and be accommodated by relative sliding of the panels 20 and the clip 32. Hence no panel distortion incident to expansion and contraction can occur at exposed panel parts even though the anchorage of the entire structure by nails is involved and even though the nailing holes 36 may not be effective to permit sliding of the clip 32 relative to the nail in the event the nail head is driven so firmly as to distort and thereby mechanically anchor the clip at the nailed point.

The siding is also characterized by effective laps at 48 and by virtue of the interlock between the clip flanges 40 and the panel flanges 28 which hold the lower part of each panel flange firmly against the outer face of the panel 20 in the next lower course. It will be observed that the lower edge of the backing panel 44 is spaced a substantial distance above the bottom flange 26 so that any moisture which accumulates at the interior of any course of the siding drains to a level below the backing panels. It will also be observed that there is a firm mechanical anchorage of both the upper and the lower margins of each panel 20 which holds the panels against displacement in high winds. The backing 44 rigidifies the construction, damps noises due to impact thereagainst and provides desirable building properties, such as insulation.

In FIG. 4 the upper marginal portion 45 of each insulation panel is of slightly reduced thickness to provide an inset to receive the clip back panel 34 so that the front face of the clip is flush with the front face of panel 44 and the plastic panel 20 may bear flat against the outer face of the insulation board 44 below the clip. One or more rearwardly diverging adjacent flanges 52 may be provided at the back of the panel 20 extending lengthwise therof, and adapted to be received in and interlock with inwardly divergent angularly extending grooves 54 formed in the front face of the insulation panel 44. This construction has the advantage that the face abutment of the plastic panel 20 with the insulation panel 44 permits the plastic panel to be made of thin material without sacrifice of strength, support or other properties of the construction.

A modified embodiment of the invention is illustrated in FIG. 6. In this construction the panel 44 has reduced thickness upper marginal portion 45, as explained above in connection with the embodiment of FIG. 4. The clip utilized in this construction has a plate portion 60 from which projects forwardly a longitudinal web 62 from which depends a hook flange 64 spaced from and substantially parallel to the bottom part of the clip plate and terminating in a longitudinal inwardly projecting hook bead 66. This clip bears against the panel part 45 and is secured by means of a nail 68 driven through the upper marginal portion of the clip plate 60 and the panel 44.

The thin exterior panel 70 utilized in this construction is characterized by an upper marginal longitudinal bead 72 which is adapted to seat and be anchored in the socket defined in the clip by the hook flange 62, 64, the hook bead 66 and the clip plate 60. Spaced below the bead 72 the panel 70 is provided with a longitudinal hook 74 projecting forwardly therefrom and terminating in a lower hook bead 76.

At its lower margin each panel 70 has a rearwardly projecting flange 78 and a pair of spaced longitudinal upwardly projecting flanges 80 and 82. Flange 80 is preferably inclined, is located adjacent to the plane of the panel 70, and serves as a retainer for the lower marginal beveled portion 43 of insulation panel 44. Flange 82 is upturned from the free rear margin of the bottom flange 78 and it preferably terminates in a forwardly projecting longitudinal bead 84.

If desired, the clip plate 60 may be provided with a rearwardly projecting flange 86, as illustrated at the lower part of FIG. 6, which extends over the upper edge of the adjacent panel 44 and thus provides a guide and support for the clip while the parts are assembled and nailed. Preferably the flange 86 is inclined and bears against a beveled edge at the top of the panel 44 as shown.

The FIG. 6 construction possesses all of the advantages previously mentioned, and in addition makes possible the selection of a panel 44 of desired thickness. Thus the panel 44, by its beveling at 43, may have its lower portion retained by the flange 80 and need not be of a thickness comparable to the butt thickness of the siding as determined by the width of the bottom flange 78. Another characteristic of this construction is that there is full face engagement of the panel 70 with the insulation board 44 without need for grooving of the latter or for ribs at the rear of the panel 70.

FIG. 7 illustrates a construction of siding wherein the use of a retaining clip is eliminated and wherein the insulation panel 44 is nailed directly to the building frame 14 by nail 90 adjacent its upper margin. The insulation panel 44 used in this construction has the beveled rear lower marginal face at 43, as above described. The outer thin panel 92 has a forwardly downwardly projecting hook flange 94 at its upper margin extending lengthwise thereof and preferably substantially full length, which hook is preferably characterized by an inner bead 96 at its lower end. A pair of adjacent longitudinal divergent rearwardly projecting flanges 98 and 100 are formed at the upper margin of the panel 92 and are adapted for reception in inwardly diverging grooves in the front face of the insulation panel 44. The diverging relation of the flanges 98 and 100 and their reception in divergent grooves in the panel 44 provide means for firmly anchoring the upper margin of each panel 92 to the backing panel 44 in such a manner that the rear face of the panel 92 may bear in full face engagement with insulation panel 44.

The lower margin of each panel 92 is constructed similarly to the lower margin of the panel 70 above described and is characterized by a longitudinal rearwardly projecting butt flange 102 terminating in an upturned flange 104 having a bead 106 for sliding interlock with the hook bead 96 of the hook flange 94 of the next lower panel. An inclined flange 108 projects upwardly from the butt flange 102 adjacent the rear face of the panel 92 and is engageable with the beveled edge 43 of the panel 40 to anchor and retain the same.

It will be seen that this construction has substantially the same advantages described above and the additional advantages of eliminating the use of clips. Relative sliding of the panels at their interlocks 94, 96 and 104, 106 accommodates ready installation and the interlocks insure that the panels 92 will be held firmly against the backing panels 44 without requiring nailing through panels 92.

Another embodiment of the invention is illustrated in FIG. 8 and is characterized by elimination of the backing panel 44. In this construction clips of the same type utilized in FIG. 6 are employed and nails 68 driven through the upper margin of the clip plate 60 pas directly into the framing of the building at 14. Each thin siding panel 112 has a plurality of spaced rearward reinforcing ribs 114. The thickness of the panel 112 and the number, location and dimensions of the ribs 114 are such as to provide the necessary stiffness and rigidity to the siding panel 112 whether formed of plastic or metal even though no support in the nature of a backing panel is provided therefor.

At the upper margin thereof, each panel 112 has a longitudinal rear abutment rib 116 spaced slightly below the top edge of the panel 112 and interrupted at its upper surface by a longitudinal groove 118 adapted to snugly but slidably receive the lower marginal portion of clip plate 60. At its upper margin panel 112 has an outturned bead 120 fitting slidably in the socket defined by the depending hook flange 64 and hook bead 66 of the clip. A longitudinal depending hook flange 122 projects forwardly from the panel 112 a slight distance below the bead 120 and in turn is provided with a longitudinal hook bead 124.

The lower margin of each panel 112 is characterized by a rearwardly projecting butt flange 126, an upturned flange 128 at the rear margin of flange 126, and a longitudinal bead 130 projecting forwardly at the front face of the flange 128 and adapted for hooked engagement with the bead 124 of the hook 122.

The mounting of this panel is the same as the mounting of the panel of FIG. 6 with the exception that the insulation panel 44 is eliminated and the abutment rib 116 at the upper margin of the panel determines the spacing thereof from the building frame or other building part 14 to which the siding is applied. Also, in this construction there is a mechanical interlock of the bottom margin of the clip plate 60 with the abutment rib 116 at the groove 118 and this supplements the sliding interlock between the clip and the panel at the panel bead 120. All advantages of weather-tight construction disclosed in the preceding forms are available with the FIG. 8 construction, and it will be understood that lapping of the ends of adjacent panels in the same course is possible by cutting short the ribs 114 and 116, bead 120, flange 124 and the flanges 126 and 128 at one end of each panel.

While the preferred embodiments of the invention have been illustrated and described, it will be understood that changes in the construction may be made within the scope of the appended claims without departing from the spirit of the invention.

I claim:

1. Building siding members mounted in horizontal courses on a building to simulate clapboard siding, comprising
    support means adapted to be nailed to a building and having a horizontal socket,
    a plurality of thin elongated siding panels extending in horizontal courses on said building,
    a longitudinal interlock member carried by the upper margin of each panel and adapted for interlocking and supporting connection with said support means at said socket,
    a longitudinal rearward flange at the lower margin of said panel, and
    means continuously interlocking the lower rear flange portion of each panel in engagement with the upper margin of the panel in the next lower course below the interlock between said last named panel and the support means therefor, said support means constituting a clip having a longitudinal hook flange and a backing plate portion cooperating to define said socket, each panel having a groove adjacent said longitudinal interlock member to receive said backing plate portion of said clip.

2. Building siding members mounted in horizontal courses on a building to simulate clapboard siding, comprising support means adapted to be nailed to a building and having a horizontal socket, a plurality of thin elongated siding panels extending in horizontal courses on said building, a longitudinal interlock member carried by the upper margin of each panel and adapted for interlocking and supporting connection with said support means at said socket, a longitudinal rearward flange at the lower margin of each panel, and means continuously interlocking the lower rear flange portion of each panel in engagement with the upper margin of the panel in the next lower course below the interlock between said last named panel and the support means therefor, said support means constituting a clip defining said socket, and said last named interlocking means including a longitudinal hook part carried by the upper margin of each siding panel adjacent and below said interlock member and receiving and anchoring said lower rear flange portion of the lower margin of the siding panel in the next higher course.

References Cited by the Examiner

UNITED STATES PATENTS

| 1,539,632 | 5/25 | Belding | 50—229 X |
| 2,766,861 | 10/56 | Abramson | 50—245 |
| 2,820,257 | 1/58 | Newton | 50—229 |
| 2,820,535 | 1/58 | Hutchinson | 50—245 |
| 3,110,130 | 11/63 | Trachtenberg | 50—245 |

EARL J. WITMER, *Primary Examiner.*